Oct. 13, 1959          H. PERSSON          2,908,203

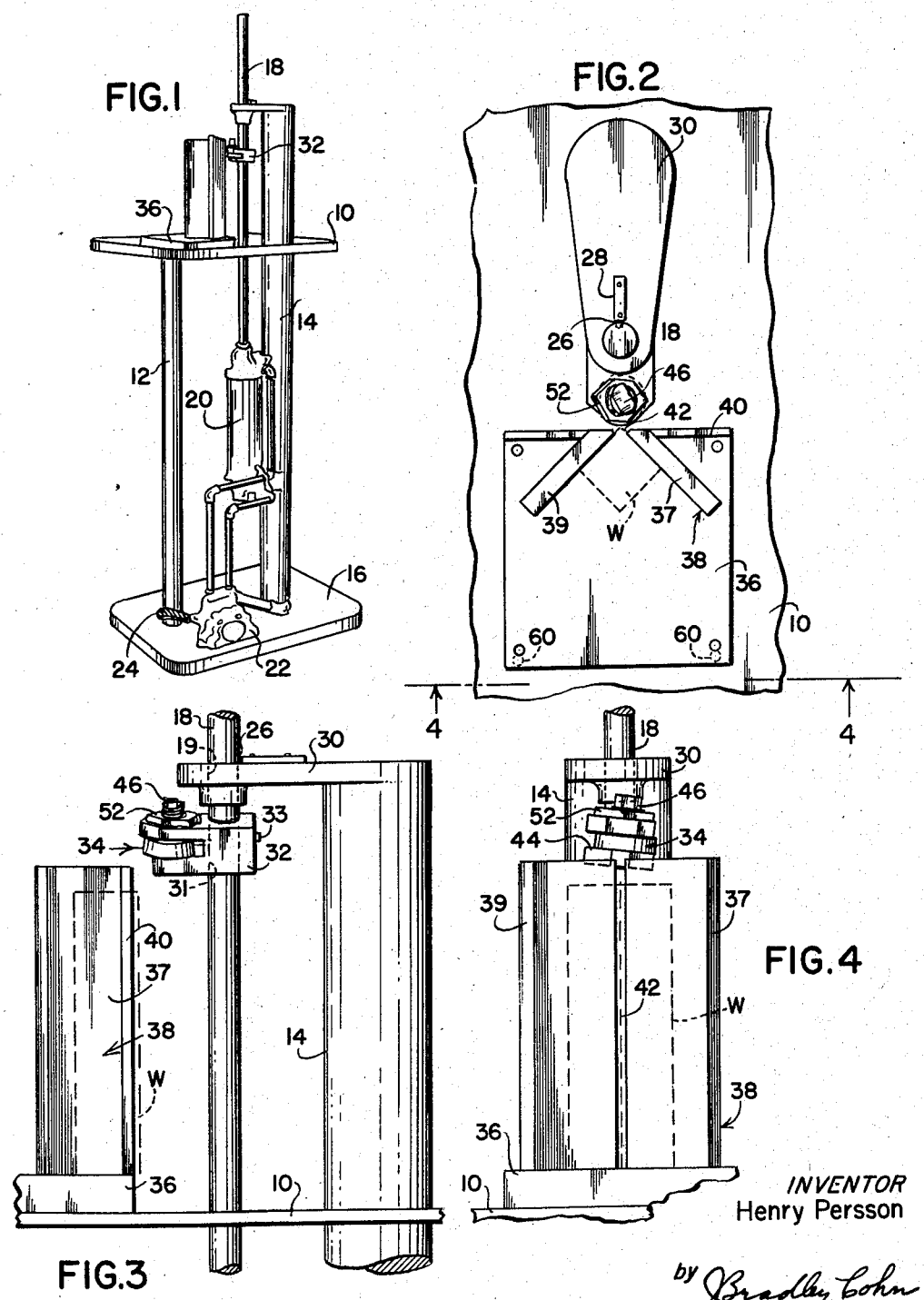

CORNER CUTTER

Filed Oct. 25, 1956          2 Sheets-Sheet 2

*INVENTOR:*
Henry Persson by *Bradley Cohn*

ATTORNEY

United States Patent Office 2,908,203
Patented Oct. 13, 1959

2,908,203

CORNER CUTTER

Henry Persson, Bloomfield, N.J., assignor to American Machine & Foundry Company, a corporation of New Jersey Application October 25, 1956, Serial No. 618,319

2 Claims. (Cl. 90—43)

This device relates to trimming the rough or sharp corners of work stock composed of metals, plastics, hard rubber, composition, laminates and castings, and particularly relates to an edge cutter for such stock.

It is the purpose of this invention to provide a simplified machine for deburring or rounding the edge of stock.

It is the general practice in dealing with stock or castings to remove the sharp edges by filing or other similar deburring operations, such as grinding and the like.

It is an object of this invention to provide a readily operable tool so that the operator may quickly, simply and efficiently remove the sharp edges of workpieces.

It is an object of this invention to remove such sharp edges by a single cutting stroke.

It is a further object of the invention to provide a cutting device wherein the operator may hold the work stock by hand and the cutting tool will draw the work stock to itself.

It is a further object of this invention to provide an angular fence against which work stock is rested and a power-operated cutting tool that will quickly, simply and efficiently remove the edge in one motion without the necessity of securing the workpiece.

It is a further object of this invention to provide a circular cutting tool having a continuous edge to increase the cutting life of the edge before re-grinding.

It is a further object of the invention to provide a cutting edge that is self-sharpening.

It is an object of this invention to provide a circular cutting tool having a self-sharpening edge by reason of its circular form and inclination of the tool.

The novel features which I believe to be characteristic of my invention are set forth with particularity in the appended claims. My invention itself, however, both as to its organization and method of operation may be understood by reference to the following description taken in connection with the accompanying drawings, in which:

Fig. 1 is a perspective view of the machine illustrating the invention;

Fig. 2 is a plan view of the same;

Fig. 3 is a side elevation of a portion of the machine showing the cutting head and the fence;

Fig. 4 is a front elevation of a portion of the machine shown in Fig. 3;

Figure 5:
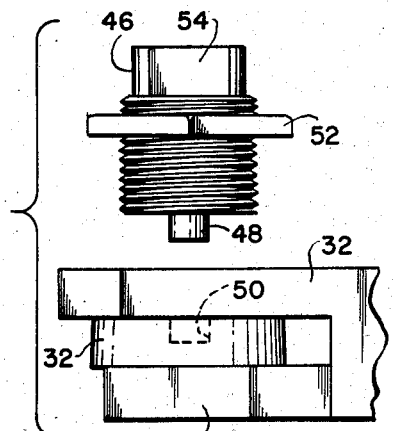
Fig. 5 is a partly exploded view showing the mounting of the cutter disc and the cutter head.

With reference to Fig. 1, there is shown the table 10 supported by the leg 12 and upright standard 14 secured to the base plate 16. Reciprocating shaft 18 is slidably supported in a bore 19 of a bracket 30 secured to the top of standard 14. The lower end of shaft 18 is secured to an air piston (not shown) operating in the pneumatic cylinder 20. The valve 22 operated by foot pedal 24 causes the shaft 18 to reciprocate vertically. Depressing of the foot pedal 24 effects a downward movement of shaft 18. Due to the spring mounting of the pedal, its release causes the shaft to be moved upward again.

A keyway 26 formed in the shaft is engaged by a key 28 secured on bracket 30 secured to prevent rotation of the shaft.

Referring to Figs. 3 and 4, the shaft 14 has adjustably mounted thereon a cutter head block 32 in which is mounted the cutter 34 as hereinafter more particularly described. On the table 10 is adjustably mounted a leveling platform 36 to which is rigidly supported a vertical fence 38. Fence 38 is composed of two members 37 and 39 (Fig. 2) positioned at right angles to each other and spaced apart to provide an opening 42 through which a corner of the workpiece W may extend for engagement with the cutter 34 during its downward stroke. Each fence member 37 and 39 has a wing bracket 40 secured to the leveling platform 36 to provide rigidity to the fence members 37 and 39. The leveling platform with its fence members 37 and 39 is removable and may be replaced with a suitable fixture to hold irregular shaped workpieces. For example, an alternative fixture might have the fence members at a different angle and different spacing as may be desired.

Figure 7:
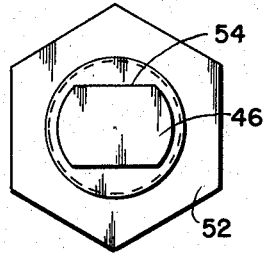
Fig. 7 is an enlarged showing of the jam nut and bolt for mounting and adjusting the cutter.
Figure 8:
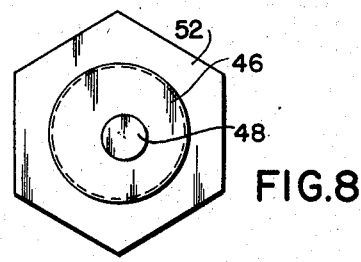
Fig. 8 shows the eccentric position of the pintle on the mounting bolt for the cutter disc.

The cutter head block 32 has an angled bore 31 for adjustable mounting on shaft 18 to which it is secured by a set screw 33. Because of the angulation of the bore 31, the block 32 and a transverse slot 44 formed therein are positioned at an angle from the horizontal (Fig. 4). The cutter 34 is adjustably positioned in this slot by means of the threaded bolt 46 having an eccentric pintle 48. Pintle 48 engages a central opening 50 of the cutter 34. It will be understood that angular rotation of the bolt 46 will, because of the eccentric location of the pintle 48, adjust the cutter toward and away from the workpiece W held by the fence 38. Jam nut 52 threaded on the bolt 46 will then lock the bolt in the desired adjusted position. The upward unthreaded portion of the bolt 46 conveniently has flats 54 (Fig. 7) to be held by a wrench while the jam nut 52 is tightened upon the top of the cutter head block 32.

Figure 9:
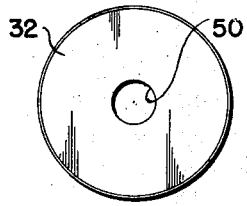
Figs. 9, 10 and 11 show, respectively, top, bottom and sectional views of the cutter disc.
Figure 11:
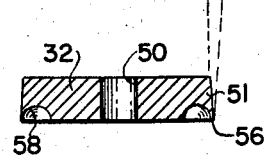
Figure 10:
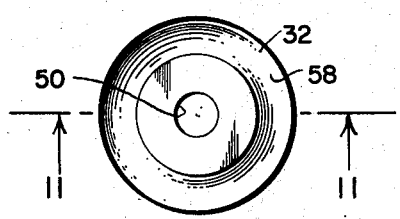

The cutter 32 (Figs. 9, 10 and 11) is a circular disc with a central opening 50. The rim 51 of the disc is angled outwardly to the cutting edge 56. An annular groove 58 cut in the bottom of the disc forms the cutting edge 56, the more lateral walls of the groove being ground to form said cutting edge 56 (Fig. 10).

Figure 6:
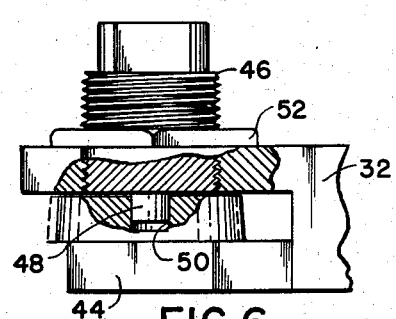
Fig. 6 is a sectional view showing the assembly of the same.

Referring to Figs. 4 and 6, it will be understood that the cutting disc 32 is freely rotatable on the pintle 48 and because of the slight angulation from the plane transverse to the path of movement of the cutter (Fig. 4) the disc rotates slightly during the cutting movement. This action not only presents a new cutting edge for each successive stroke but also provides a grinding or self-sharpening action in the lateral walls of the annular groove 58 of the workpiece W. The rim 51 is itself formed at a slight angle $a$ (Fig. 11) from a plane parallel to the axis of the shaft. This angulation draws the workpiece W toward the cutter 32 during its cutting stroke thus holding the workpiece tight against the fence 38 obviating the necessity of any workholding device other than the fence and the leveling platform 36.

Figure 12:
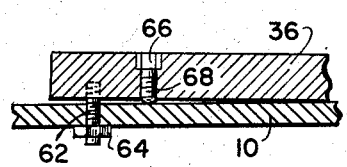
Fig. 12 is a detailed view showing the mounting and leveling means for the leveling platform.

Referring to Figs. 2 and 12 the leveling platform 36 is adjustably secured to the table 10 by the bolts 62 attached to the table block 36 and passing through bores 60 formed in the table 10. Nut 64 permits adjustable retention of these bolts 62. Adjacent each of the bolts 62 is a threaded bore 66 through leveling block 36 for receiving a headless screw 68 which as shown in Fig. 12 thrusts against table 10 for leveling so that the surface of block 36 is in a plane transverse the path of movement of the cutter head block 32.

I claim:

1. In a corner trimmer adaptable for solid metal stock, a power-operated reciprocating cutting head, a cutting tool secured to said head, a member having a flat surface to form a workpiece abutment, a fence vertical to said surface comprising a pair of spaced angularly disposed work engaging members, said members being constructed and arranged to provide surfaces to engage and support adjacent sides of a workpiece and being spaced sufficiently to form an opening therebetween to permit the corner formed by the adjacent sides of a workpiece so engaged to extend to the opposite side of said fence, said cutting tool being entirely on said opposite side of said fence and reciprocating substantially parallel to said opening formed by said spaced members, said cutting tool being a disc-shaped member having an annular groove in its bottom surface intersecting with the peripheral surface of the disc-shaped member to form a chiseled edge, said member being concentrically and rotatably mounted in said head so said edge will be toward and in a plane substantially parallel to the plane of said abutment surface, said edge and said disc being constructed and mounted so that the peripheral surface of said chiseled edge is tilted slightly with respect to the plane of the edges of said work engaging members forming said opening so that said edge and said peripheral surface will tend to draw a workpiece toward said tool and tight against said fence when said edge engages a corner portion of a workpiece extending through said fence.

2. In a corner trimmer adapted for solid metal stock, a power-operated reciprocating cutting head, a cutting tool secured to said head, a member having a flat surface to form a workpiece abutment, a fence vertical to said surface comprising a pair of spaced angularly disposed engaging members, said members being constructed and arranged to provide surfaces to engage and support adjacent sides of a workpiece and being spaced sufficiently to form an opening therebetween to permit a corner formed by the adjacent sides of a workpiece so engaged to extend to the opposite side of said fence, said cutting tool being entirely on said opposite side of said fence and reciprocating substantially parallel to said opening formed by said spaced members, said cutting tool having a surface intersected by another surface to form a chisel-like edge, said cutting tool being mounted in said head so said chisel-like edge will have a linear dimension in a plane substantially parallel to the plane of said abutment surface, said member being constructed and mounted so that the intersected surface of said chisel-edged tool is tilted slightly from said fence so that said edge and said surface will tend to draw a workpiece toward said tool and tight against said fence when said edge engages a corner portion of a workpiece extending through said fence.

References Cited in the file of this patent

UNITED STATES PATENTS

| | | |
|---|---|---|
| 589,010 | Merrill | Aug. 31, 1897 |
| 781,508 | Fernow | Jan. 31, 1905 |
| 2,054,311 | Adams | Sept. 15, 1936 |
| 2,233,724 | Bannister et al. | Mar. 4, 1941 |
| 2,551,167 | Rolland | May 1, 1951 |
| 2,614,326 | Loock | Oct. 21, 1952 |